March 20, 1956 H. PANZERBIETER ET AL 2,739,185

AUTOMATIC TELEPHONE SYSTEM

Filed Feb. 28, 1952 4 Sheets-Sheet 1

Inventors
Hans Panzerbieter,
Kurt Hagenhaus,
Hans Joachim Jabczynski,
Adolf Backer, &
Gerd Tiesler.

By [signature] Atty.

AUTOMATIC TELEPHONE SYSTEM

Filed Feb. 28, 1952

Inventors.
Hans Panzerbieter,
Kurt Hagenhaus,
Hans Joachim Jabczynski,
Adolf Bacher, &
Gerd Tiesler.

By [signature] Attys.

Inventors.
Hans Panzerbieter,
Kurt Hagenhaus,
Hans Joachim Jabczynski,
Adolf Bacher, &
Gerd Tiesler.
By. [signature] Atty.

March 20, 1956 H. PANZERBIETER ET AL 2,739,185

AUTOMATIC TELEPHONE SYSTEM

Filed Feb. 28, 1952 4 Sheets-Sheet 4

Inventors,
Hans Panzerbieter,
Kurt Hagenhaus,
Hans Joachim Jabczynski,
Adolf Backer, &
Gerd Tiesler.

By [signature] Atty.

United States Patent Office 2,739,185

Patented Mar. 20, 1956

2,739,185

AUTOMATIC TELEPHONE SYSTEM

Hans Panzerbieter and Kurt Hagenhaus, Berlin-Siemensstadt, Hans-Joachim Jabczynski, Berlin-Zehlendorf, Adolf Bacher, Berlin-Nikolassee, and Gerd Tiesler, Berlin-Charlottenburg, Germany, assignors to Siemens & Halske Aktiengesellschaft, Munich, Germany, a corporation of Germany Application February 28, 1952, Serial No. 273,812

Claims priority, application Germany March 10, 1951

27 Claims. (Cl. 179—18)

This invention relates to signalling systems and is particularly concerned with an automatic telephone system having switches for establishing connections between calling and called lines and comprising control means for governing certain operations of the switches in the calling (incoming) and called (outgoing) circuit branches of connections, by transmitting thereto periodically recurring marker signals in the form of impulses or groups of impulses which are displaced as to time, so as to cause such switches to complete connections only responsive to the simultaneous occurrence of the marker signals in the respective incoming and outgoing circuit branches of calls which are being set up.

Among the advantages of the system made in accordance with the invention is the possibility to establish a plurality of simultaneous connections over multipled trunk lines without introducing the danger of cross-connections. This is made possible because the sets of marker signals, which are connected to a plurality of incoming and outgoing circuit branches of simultaneous calls, are resolved into control signals which become individually effective in the associated switches.

The various objects and features of the invention will become apparent from the description which will presently be rendered with reference to the accompanying drawings, in which Figs. 1*a* and 1*b*, when placed together, Fig. 1*a* above Fig. 1*b*, illustrate in diagrammatic manner a 1000-line system;

Fig. 2 indicates the form of periodically effective marking signals;

Figure 1A:
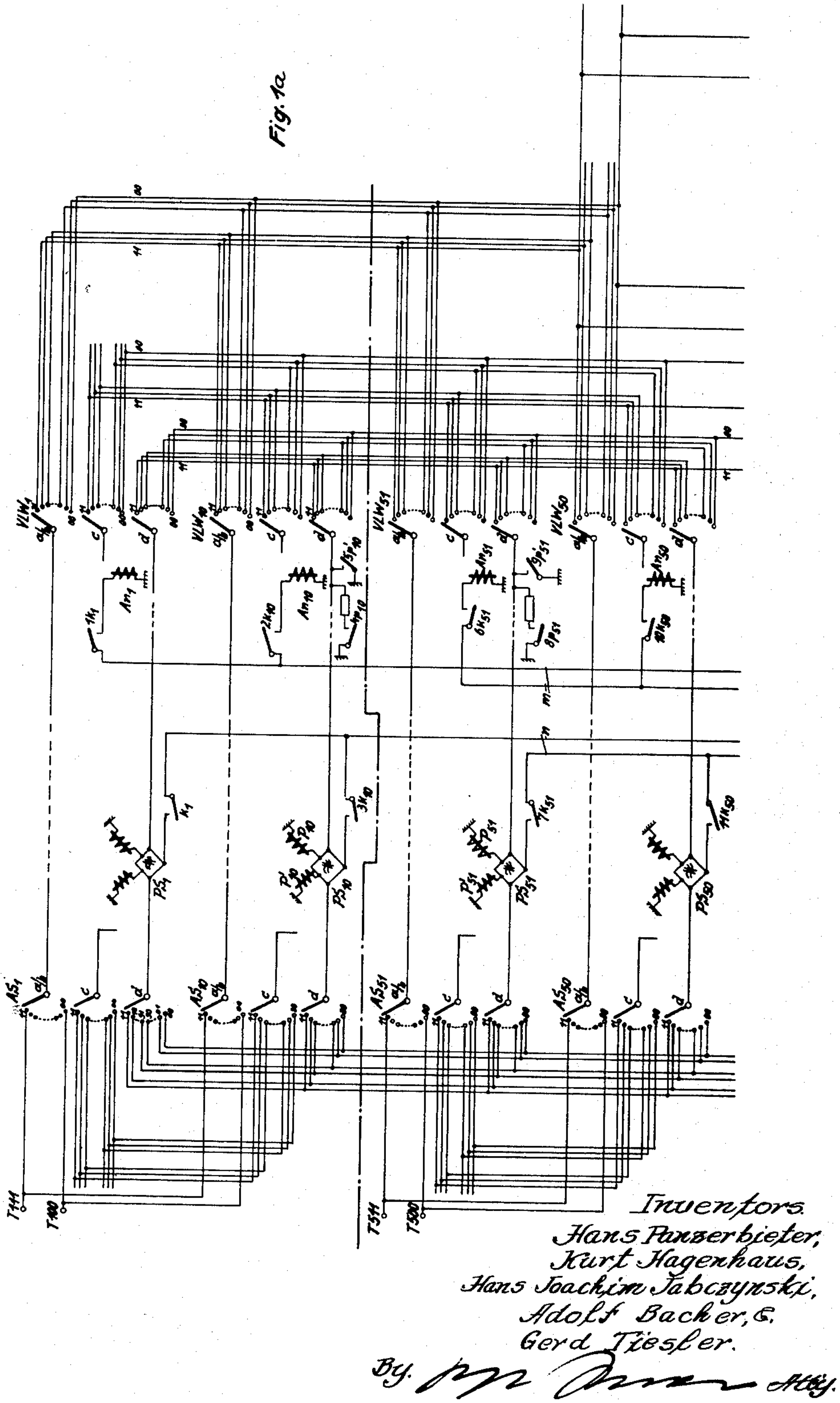
Figures 1B, 2:
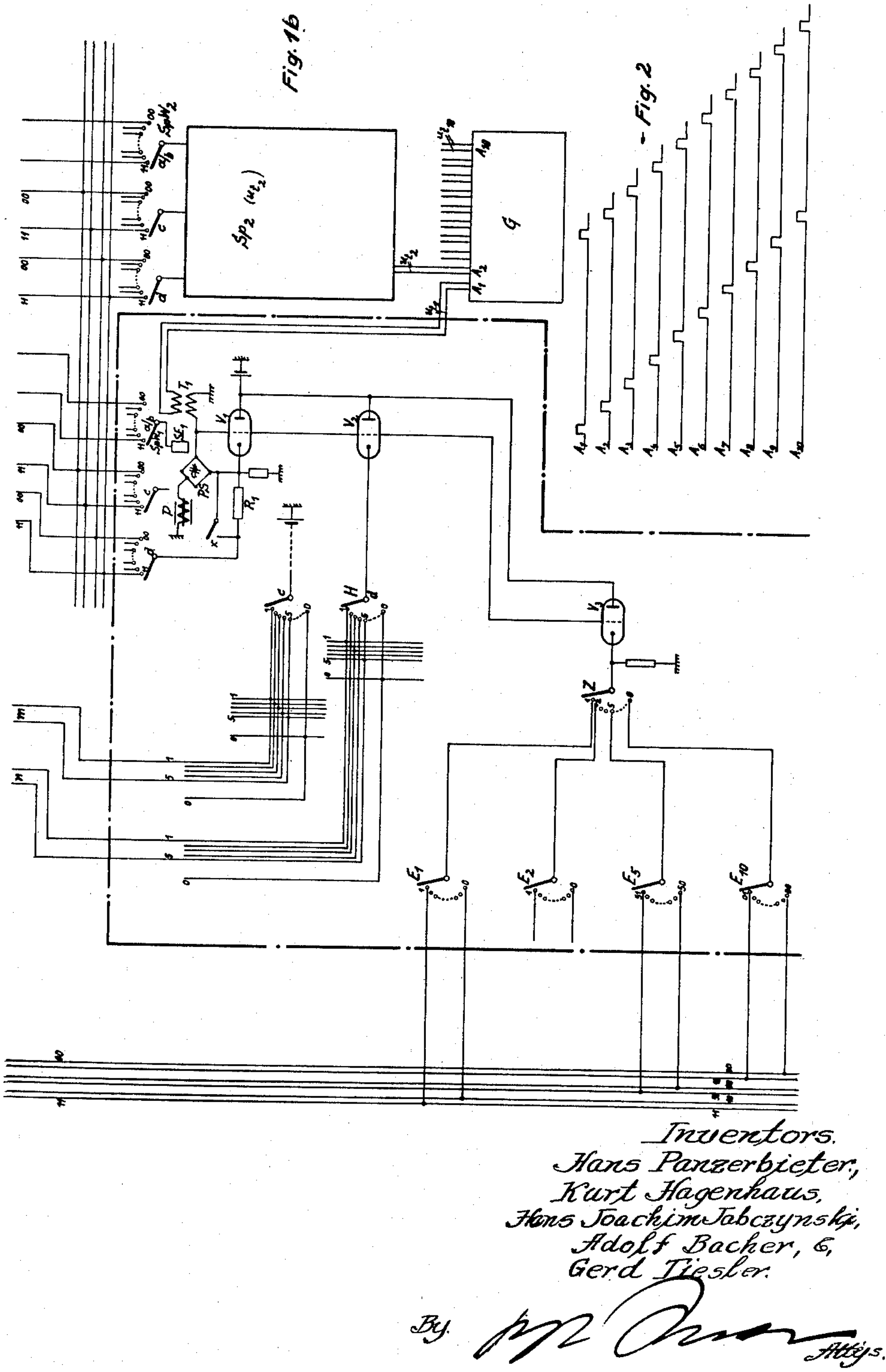
Figures 3, 4, 5, 6, 7, 8, 9, 10, 11, 12, 14, 15:
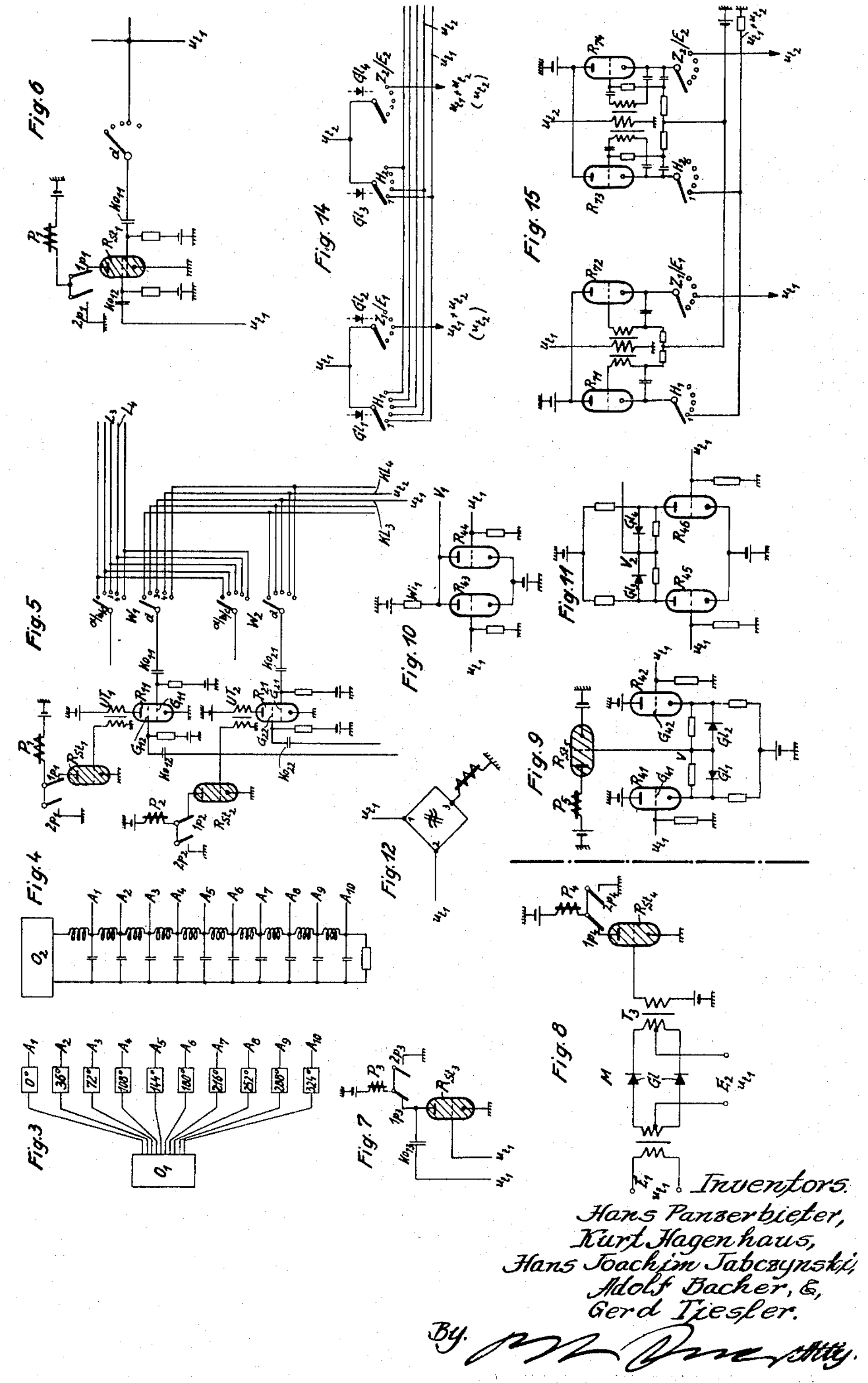
Figs. 3 and 4 show embodiments of generators for producing the marking signals.
Figs. 5–11 show test circuits.
Figures 13, 16, 17:
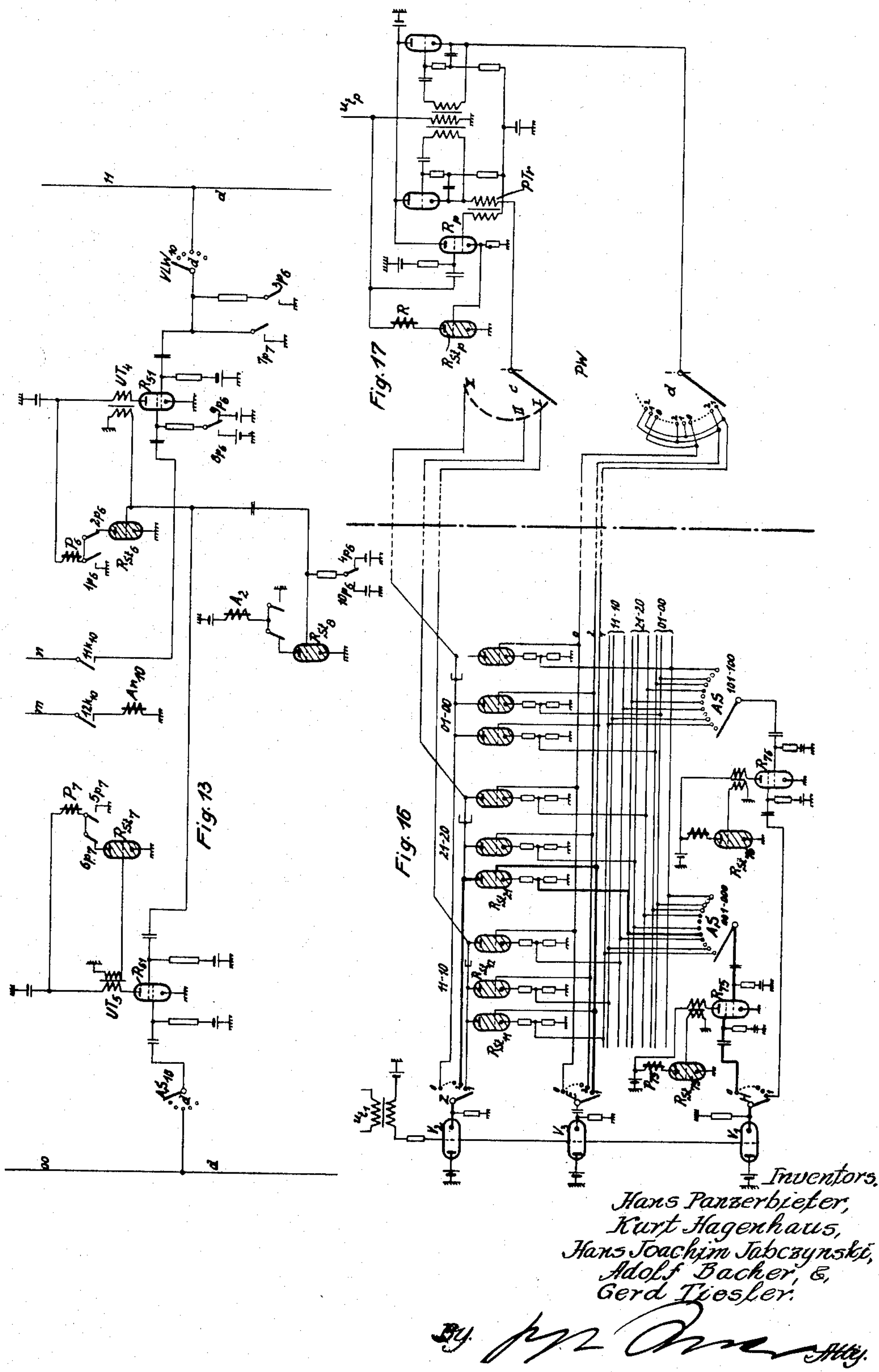

Fig. 12 indicates elements of a test circuit employed in the system shown in Figs. 1*a* and 1*b*;

Fig. 13 is a test circuit for a trunk selector and for a line finder;

Figs. 14 and 15 show circuit details;

Fig. 16 illustrates a modified control circuit for controlling the building up of connections in a 1000-line system; and Fig. 17 is a circuit for testing the electron discharge tubes of Fig. 16 during the operation of the system.

The one thousand subscribers' lines of the system shown in Figs. 1*a* and 1*b* are subdivided into ten groups of one hundred each, each group having ten line and associated trunk selectors. In the first 100-group there are, for example, the line finders AS1–AS10 which are, respectively, associated with the trunk selectors VLW1–VLW10, and in the fifth 100-group there are the line finders AS51–AS50 which are, respectively, associated with the trunk selectors VLW51–VLW50. If it is assumed that the subscriber T111 in the first 100-group removes the receiver, the subscriber's line equipment will, by suitable circuit means (not shown), produce a call-initiating signal which will cause one of the ten line finders serving this group, for example, the 100-point line finder AS1, to operate. The subscriber's line equipment has not been shown, because any suitable desired and known equipment may be used to produce the indicated line finder operation. The line finder AS1 hunts for and seizes the calling line T111 by causing a test relay (not shown), which is connected to the private conductor of its wiper *c*, to operate in a test circuit to a potential on the bank contact 11, thereby stopping the operation of the line finder AS1. The calling line is in usual manner busied against seizure from the connectors. The associated 100-point trunk selector VLW1 is at the same time started to hunt for an idle one of the one hundred available trunk lines 11 . . . 00, the seizure of which is in usual manner effected by the operation of a test relay (not shown) connected with its wiper *c*. If the trunk line 11 is idle, the trunk selector VLW1 will stop with its wipers in engagement with bank contacts 11 and the associated test relay (not shown) will operate in a circuit including the wiper *c*. Busy potential will in usual manner be placed on the test or private conductor of the seized trunk line in order to guard it against seizure from other trunk selectors.

An idle storage device is now made available for receiving the digits corresponding to the called subscriber's number, by a storage switch which had been connected in preparatory position (by preselection) with the terminals of the trunk line 11, or which is set in operation to connect with such trunk line after it has been seized by the trunk selector. The manner of preselection of trunk lines by switches associated with the storage devices or selection thereof when they are seized may follow well established operating principles. If it is assumed that the storage-connect switch *Sp*W1 has made connection with the conductors of the trunk line 11, its wiper *c* will be in engagement with the bank contact 11 (trunk line 11 seized by the trunk selector VLW1) and will have busied the trunk line against seizure by other storage-connect switches, for example, by the switch *Sp*2. The calling line T111 is now connected with the trunk line 11 and with the storage device *Sp*W1 over the line finder AS1 and the associated trunk selector VLW1.

There is provided a common generator G (shown in Fig. 1*b* just underneath the storage device *Sp*2) which transmits periodically momentarily effective impulses having a curve form suitable for the operation of switches, for example, rectangular impulses. These impulses are used as marker or control impulses or signals for governing the establishing of calls over circuit portions incoming from the calling parties and outgoing to the desired called parties, respectively.

As shown in Fig. 2, each current impulse is displaced as to time relative to each other impulse, so that only one impulse is at any time momentarily effective. More particularly, the current impulse *ut*1 is effective at the instant *t*1; the impulse *ut*2 at the instant *t*2, etc.; and the impulse *ut*10 is effective at the instant *t*10. Instead of using individual current impulses, groups of such impulses may be used to make the operation more accurate and more sensitive.

An embodiment of a generator for producing marker signals in the form of individual impulses is diagrammatically shown in Fig. 3. The generator is in this case an oscillator O1 which delivers oscillations of sine wave form. The frequency of the oscillator determines the frequency of the marker signals. There are provided serially related phase-regulating or time-regulating elements (not shown) which produce phase displacement of 0°, 36°, 72°, etc., resulting in the output circuits A1–A10. At these output circuits are delivered the impulses which are in point of time displaced as indicated in Fig. 2. Suitable circuit control elements (not shown in Fig. 3) are provided in the output circuits A1–A10 which shape the individual impulses so as to produce the curves shown in Fig. 2.

The generator may also be a device as diagrammatically shown in Fig. 4, comprising an oscillator O2 which delivers cyclical impulses and having serially disposed means for delivering at the output circuits A1–A10 impulses which are displaced as to time.

The transmission of impulses by a generator according to Fig. 3 or 4, or by equivalent generator means, over the circuits A1–A10 is periodically repeated. One of these impulses, which is in point of time displaced relative to the other impulses, for example, the impulse *ut*1, is in the present example assigned to a storage device (by the interconnection of the storage device with the corresponding output circuit of the generator), in the assumed example, to the storage device S*p*1. The periodically effective impulse *ut*2 is similarly assigned to the storage device S*p*2. The remaining impulses are assigned to corresponding storage devices (not shown in the drawing).

The arrangement may of course be effected in such a manner that any seized storage device is connected by an associated switch S*p*W1 or S*p*W2 with an idle outlet of the generator so that there is no predetermined assignment of marker signals or impulses. The marker signals or impulses may also be assigned for example, so that a definite impulse is assigned to each 100-group, and that such marker signal impulse is temporarily assigned to the storage device serving at any time for the building up of connections in the corresponding group. For example, in the case of selection equipment belonging to the first 100-group for making connections between calling (incoming) and called (outgoing) branches of calls to be established, the storage device will receive marker signal impulses assigned to this group for the time of building up the corresponding calls.

The marker signal impulses are used for controlling the operation of selector switches involved in building up calls. The switches may be step-by-step switches or motor-operated switches or relay switches or electronic switches, or the like. The test circuits to be used in the selection of lines or trunks may be of any suitable structure having switching elements which are responsive to the momentarily effective marker signal impulses, for the purpose of stopping the operations of the associated switches. Figs. 5–11 show examples of test circuits according to the invention.

Fig. 5 illustrates a circuit employing electron discharge tubes. If it is assumed that the wipers of the switch W1 are to be set in engagement with the line L3, this line will be marked by transmitting over the associated marker line KL3 a marker signal impulse *ut*1 which is periodically effective at the instant *t*1. The marker line KL3 is connected with the bank contact 3. If it is further assumed that the wipers of the switch W2 are to be set in engagement with the line L4, this line will be marked by transmitting to its bank contact 4 over the marker line KL4 a current impulse *ut*2 which is periodically effective at the instant *t*2. The wiper *d* of the switch W1 is connected with the grid G11 of the tube R11 over the capacitor KO11. The wiper *d* of the switch W2 is connected over the capacitor KO21 with the grid G21 of the tube R21. The current impulse *ut*1, which is periodically effective at the instant *t*1, is also momentarily connected to the grid G12 of the tube R11 over the capacitor KO12; and the current impulse *ut*2, which occurs periodically at the instant *t*2, is also connected to the grid G22 of the tube R21 over the capacitor KO22. It will be realized that other contacts and circuit points may be similarly marked by the marker signal impulses from the generator G shown in Fig. 1*b*.

The number of impulses for a predetermined period depends on the number of connections to be simultaneously established. If it is, for example, desired to establish ten simultaneous connections in a group of one hundred lines, there will be produced at a predetermined period ten impulses which are displaced as to time. It is of course necessary to keep the duration of each period so short that all ten impulses are transmitted during the interval required for the switch wipers to sweep over one set of bank contacts, with a sufficient margin to permit the operation of the test circuit of the associated switch that has seized predetermined bank contacts. If it is, for example, assumed that the time required for the test wiper of a switch to sweep over one set of bank contacts is $3.10^{-3}$ sec., and that it is possible to stop the switch in $1.5.10^{-3}$ sec. after energization of the test relay, the period during which the ten marker signal impulses must be transmitted will amount to $0.5.10^{-3}$ sec. Inasmuch as such period must accommodate ten impulse lengths and ten intervals between impulses, the length of each impulse must equal $25\mu$ sec. The requirements are fulfilled by the discharge tubes R11 and R21 shown in Fig. 5. These tubes become conductive when the associated wipers *d* engage the bank contacts 3 and 4, respectively; that is, the tube R11 becomes conductive when the wiper *d* of switch W1 engages the bank contact 3, since the current impulse *ut*1 is simultaneously effective on the grids G11 and G12, and the tube R21 becomes conductive when the wiper *d* of the switch W2 engages the bank contact 4, since the current impulse *ut*2 is at that instant effective on the grids G21 and G22. The operation of the tube R11 produces current flow over the primary winding of the transformer UT1 for the firing of the tube RS*t*1, thus producing an impulse for the energization of the relay P1. This relay disconnects the tube RS*t*1 by opening its contact 1*p*1 and places its own winding in a holding circuit by closing its contact 2*p*1. The operation of the relay P1 stops the switch W1 in known manner. Its wipers *a*/*b*/*c* are now in engagement with a set of seized bank contacts connecting the associated line or trunk conductors, and further switching can now take place over these conductors. The switching through of the incoming branch of the circuit (from the calling party) to the outgoing branch thereof (called party) is thus effected by the simultaneous occurrence of identical marker signal impulses on the two control grids of the tube R11. The tube RS*t*2 is in similar manner operated when the wiper *d* of switch W2 reaches the bank contact 4. The relay P2 will in this case energize to stop the switch W2 with its wipers *a*/*b*/*c* in engagement with a set of bank contacts connected to an associated line or trunk.

In Fig. 6 there is, in place of the tubes R11 and RS*t*1, a double grid tube RS*t* which becomes conductive only at the instant when marker current signals (for example, impulses *ut*1) are simultaneously connected to both of its grids. The relay P1 will in this case become energized. At its contact 1*p*1 the tube is disconnected, and at the contact 2*p*1 relay P1 connects itself in a holding circuit. The tube RS*t* thus performs the operations assigned to the tubes R11 and RS*t*1 shown in Fig. 5.

The test circuit indicated in Fig. 7 comprises a discharge tube RS*t*3 which becomes conductive at the instant when simultaneous marker impulses affect its grid and its anode over the capacitor KO13, at the moment when the test wiper of the associated switch (not shown) reaches a marked bank contact. The firing of the tube causes energization of the relay P3 which controls the switching operation already described in connection with the test circuits of Figs. 5 and 6.

Fig. 8 shows a test circuit which employs for the seizure of a line or trunk a modulator circuit M instead of a discharge tube. If a current impulse, for example, the impulse *ut*1, is simultaneously connected to the input terminals E1 and E2, the rectifiers G1 become operative in the nature of valves, the impulse placed on the input terminal E2 being operative to cause passage of the current impulse placed at the same instant on the input terminal E1. The discharge tube RS*t*4 is then fired by current from the transformer T3 to cause operation of the relay P4 for the switching purposes already described.

In Fig. 9 is shown a test circuit which utilizes discharge tubes as well as rectifiers for the comparison of the simultaneous occurrence of the marker current impluses incident to the selection operation of an associated switch. The operation is as follows: If a current impulse is connected only to the grid G41 of the tube R41, there will not occur sufficient firing potential at the point V (assuming correct bias on the cathodes by resistors shown in the form of small rectangles), since the rectifier G11 is effective with a very much smaller pass resistance, and the tube R41 will remain inoperative. A similar condition will result if an impulse is connected only to the grid G42 of the tube R42. But, if a current impulse, for example, the marker impulse *ut*1, affects the grids of the two tubes simultaneously, there will be sufficient potential at the point V, and the tube RS*t*5 will become operative to cause energization of the relay P5. The latter executes the switching operations already described, thereby stopping the associated switch, which may be a switch W1 or W2 such as shown in Fig. 5.

Fig. 10 illustrates a test circuit comprising two discharge tubes R43 and R44. The plates or anodes of these tubes are over a common resistor W*i*1 on a positive potential, and the grids are so biased that the tubes are conductive until they become extinguished at the instant when a marker signal impulse, for example, the impulse *ut*1, is simultaneously connected to their grids. There will then be a potential on the conductor V1 for carrying out the desired switching operations already described.

The test circuit of Fig. 11 employs two discharge tubes R45 and R46 having anodes which are interconnected over associated resistors and oppositely poled rectifiers G13 and G14. Simultaneous marker signal impulses on the grids of the two tubes produce firing thereof, and a potential is accordingly set up at the point V2, which is utilized for carrying out the previously described switching operations.

Test circuits such as described with reference to Figs. 5–11 may be used in the switches employed in the system shown in Figs. 1*a* and 1*b* for testing for the simultaneous presence of the marker signal impulses incident to the operation thereof. One of the test circuits thus employed in Figs. 1*a* and 1*b* is, for the sake of clarity, separately diagrammatically shown in Fig. 12. The conductors required for testing for the simultaneous occurrence of the marker signal impulses are connected at predetermined terminals, for example, at the terminals 1 and 2. To the terminal 3 may be connected a relay which is operatively affected by the marker signal impulses.

As already explained, a marker signal impulse, for example, the impulse *ut*1, which is momentarily effective at the instant *t*1, is assigned to the storage device S*p*1 of Fig. 1*b*, and the impulse *ut*2, which occurs at the instant *t*2, is similarly assigned to the storage device S*p*2. Further momentarily effective marker signal impulses produced in the generator G (see also Fig. 2) are similarly assigned to eight additional storage devices (not shown). There are thus in a 1000-line system ten storage devices with associated storage-connect switches (as indicated in Fig. 1*b*) so as to take care of ten simultaneous connections within the one hundred multipled trunk lines provided for the one thousand subscribers. It has been assumed that the storage-connect switch S*p*W1 has operated and has set its wipers on bank contacts 11, thus establishing connection with the trunk line seized by the trunk selector VLW1 which is connected with the calling line T111. The marker current impulse *ut*1, which is transmitted to the amplifier tube V1 over the transformer T1 at the instant *t*1, therefore becomes effective on the trunk conductor 11 over the wiper *d* of the storage-connect switch S*p*W1. The corresponding trunk line is multipled and therefore accessible to one hundred trunk selectors and such marker impulse thus occurs periodically at certain instants on all bank contacts 11 which are accessible to the wipers *d* of the one hundred trunk selector switches.

It shall now be assumed that the calling party T111 transmits the first digit of the called subscriber's number, for example, T100. This digit consists of a single impulse which is effective in the impuse-receiving device SE1 over the line wipers *a*—*b* of the storage-connect switch S*p*W1. This device causes the 10-point switch H of the first 100-group to step its wipers *c* and *d* in engagement with bank contacts 1. The contact 1*k*1 (top of Fig. 1*a*) is open, due to the operated condition of the trunk selector VLW1. It is assumed that the eight remaining trunk selector switches are not available for establishing the call and therefore only the contact 2*k*10 is in its operated position, the trunk selector VLW10 being assumed to be idle. Accordingly, a direct current potential is placed by the wiper *c* of the selector H on it associated bank contact, and hence on the conductor *m* leading over the closed contact 2*k*10 to the start relay A*n*10. This relay energizes and starts the selector VLW10 of the tenth set in the first 100-group. The test circuit of the selector VLW10, which may be any known desired and suitable test circuit, is thereby switched over so as to permit the testing operation of the switch VLW10 over its wiper *d*. The operation of the test circuit will stop the switch at the instant when the wiper *d* reaches the bank contact 11, since the marker signal impulse *ut*1 is periodically placed on this bank contact over the associated trunk after amplification by the tube V1, and since this marker impulse is also placed on the bank contact 1 of the switch H over the wiper *d* thereof after amplification by the tube V2. The marker impulse *ut*1 thus appears periodically on the bank contact 11 which is engaged by the wiper *d* of the trunk selector VLW1 in the calling branch of the call from the calling party and also on the bank contact 11 accessible to the wiper *d* of the trunk selector VLW10 in the branch which will be extended to the called line T100. The conductor *n* connected with the bank contact 1 of the switch H (wiper *d*) connects with the contact 3*k*10 of the selector VLW10 which is at this instant closed (selector VLW10 being assumed to be idle), thus also connecting the marker signal impulse to the test circuit PS10 (Fig. 1*a*) in the branch leading to the called line T100. The relay P10 energizes and stops the trunk selector VLW10 in usual and known manner. The contact 4*p*10 is closed and the potential in the circuit, including the wiper *d* of the selector VLW10, is thereby altered so as to reduce the voltage of the marker signal impulse *ut*1 which had been amplified by the amplifier tube V1. The conductors connected to the bank contacts 1 and occupied by the wipers *c* and *d* of the 10-point switch H are now disconnected by the contacts 2*k*10 and 3*k*10 which open, due to the progressive operation of a counting chain. Counting chains suitable for this purpose are known and details therefore have been omitted. In the event that another subscriber calls during the building up of the connection between the lines T111 and T100 and dials within the same 100-group, but by the use of another storage device, for example, the storage device S*p*2, to which is assigned the current marker impulse *ut*2, another trunk selector in the first 100-group will start and a corresponding 10-point selector such as H (Fig. 1*b*) will place its wipers in engagement with contacts 1. The marker signal impulses *ut*1 and *ut*2 will then be effective for the test circuits of both trunk-selecting switches, due to the multiple in which all bank contacts 1 accessible to the wipers *d* of the selectors in the 100-group are connected. Accordingly, that trunk-selecting switch will be stopped first whose test circuit is first affected by one of the marker signal impulses *ut*1 or *ut*2, while the other trunk-selecting switch is stopped in engagement with other bank contacts. However, this is unimportant, since both subscribers desire connection in the same 100-group. In case of simultaneous calls in different 100-groups, each marker signal impulse will affect only one trunk selector.

Expedients other than the illustrated contacts of the starting chain may be used in the selection of the identical 100-group so as to effect successive operation of the corresponding trunk selectors. An additional wiper may be provided for each 100-group switch, for connecting with a test relay, which causes immediate operation of a trunk selector only if no other trunk selector is operated in this group. If this is the case, the start and test circuits of the trunk selector will be closed, and will be opened again after the selection operation is completed.

The next digit dialled by the calling party T111 (calling the line T100) which consists of ten impulses, is again effective to the impulse-receiving device SE associated with the storage device *Sp*W1 (Fig. 1*b*), and the 10-point tens switch Z will now be operated to set its wiper in engagement with the bank contact 0. The next successive digit, which also consists of ten impulses, is in similar manner effective to the 10-point units switch E10 which sets its wipers in engagement with the bank contacts 00. The line 00 in this group is now marked by connecting thereto the marker signal impulse *ut*1 over the amplifier tube V3. The resistor R1 in the storage device *Sp*1 is shunted by the contact *x* at the termination of the third digit, and the potential of the marker impulse *ut*1, which is now on the line 11 occupied by the wiper *d* of the trunk selector VLW10, is now increased so as to start the line finder AS10 (in a manner to be presently explained) which is associated with the trunk selector VLW10. When the wiper *d* of the line finder AS10 (which now operates as a connector) reaches the bank contact 00 (of the called line T100) to which the marker impulse *ut*1 is periodically transmitted at the instant *t*1, the relay P10 in the test circuit PS10 will energize, since the marker impulse *ut*1 is also effective over the wiper *d* of the trunk switch VLW10 which stands upon the bank contact 11 and therewith on the conductor 11, and the energization of the relay P10 stops the line finder AS10. The closure of contact **5*p*10** places ground on the wiper *d* of the storage-connect switch *Sp*W1, thus shunting and accordingly deenergizing the relay P in such connect switch and releasing the storage device *Sp*1.

The connection from the calling party T111 to the called party T100 is now completed over the line finder AS1, the trunk selector VLW1, the conductors of the trunk line 11, the trunk switch VLW10 and the line finder AS10.

Fig. 13 shows in greater detail the test circuits which serve for the setting of the trunk selector switch VLW10 and of the line finder AS10 in the building up of the connection just described. At the left hand side of the figure is indicated the *d*-conductor mutiple of the one hundred subscribers, and at the right hand side the *d*-conductor multiple of the trunk lines. One of the *d*-conductors in each of these multiples is shown in the drawing. As will be recalled from the description of Fig. 1, the control or storage device *Sp*1, is connected for receiving the digits of the called number after the associated connect switch *Sp*W1 has operated to connect with the incoming branch of the connection which is being built up. This control or connect switch has been omitted from Fig. 13. The marker signal impulse *ut*1 is assigned to the storage device *Sp*1. After dialling the first digit, which consists of a single impulse (the desired number having been assumed to be line T100), the 100-group switch H of Fig. 1 has placed its wipers *c* and *d* upon bank contacts connected with the conductors 1. These conductors are designated in Fig. 13 by *m* and *n*, respectively. The start relay A*n*10 of the trunk switch VLW10 is energized from the conductor *m* and the chain contact **12*k*10 (contact 2*k*10 in Fig. 1), to start operation of the associated set of switches AS10—VLW10** in the called or outgoing branch of the call to be set up. The assigned marker signal impulse *ut*1 is delivered to the upper control grid of the tube R51 over the conductor *n* (coming from the 100-group switch H shown in Fig. 1) and the contact **11*k*10 (contact 3*k*10** in Fig. 1). The trunk line in the incoming branch of the call which is being built up and which has been seized by the calling party T111 is also marked by the identical marker signal impulse *ut*1 from the storage device Sp1, the circuit extending over the conductor 11 which is multipled at the bank contact *d* of the trunk selector. When the wiper *d* of the trunk selector VLW10, which is shown at the right side of Fig. 13, reaches the bank contact connected with the conductor 11, the marker signal impulse *ut*1 will reach the lower control grid of the tube R51. Accordingly, anode or plate current will flow in the tube R51 by the simultaneous effect of the marker current impulse on both control grids, and this current flow will be effective to the primary winding of the transformer UT4 and will cause the tube RS*t*6 to pass current. The relay P6 will energize in the anode or plate circuit of the tube RS*t*6 and will place its own winding in a holding circuit over the contact **1*p*6. Contact 2*p*6** will be open to extinguish the tube RS*t*6. Closure of the contact **3*p*6** prevents premature operation of the tube RS*t*8. Opening of contact **4*p*6 and closure of contact 10*p*6** cancels the blocking potential on the grid of the tube RS*t*8, but this tube does not become operative at this instant. Contact **8*p*6 closes and places a potential on the upper control grid of tube R51 to prepare this tube for subsequent connection to the lower grid of signal impulses of greater amplitude. The contacts 11*k*10 and 12*k*10** are opened upon operation of the selector VLW10. The marker signal impulse *ut*1 is conected, as described in connection with Fig. 1, to the conductor *d* of the line 00 in the outgoing branch of the call, that is, in the line multiple at the left end of Fig. 13, after transmission of the second and third digits to the control or storage device *Sp*1 of Fig. 1, the connection of this marker signal impulse being over the circuit including the wipers of the tens switch Z and the units switch E of Fig. 1. The value of the impulse *ut*1 is now increased (shunting of the resistor R1 in Fig. 1*b*) in the storage device *Sp*1 so that the tube RS*t*8 becomes conductive (the tube R51 passing the impulse of greater amplitude), thus causing energization of the start relay A2 of the line finder AS10 shown in Fig. 13. This start relay causes the line finder AS10 to start its operation in usual manner. When the wiper *d* of this line finder AS10 finds the *d*-conductor of the called line 00, anode current will flow in the tube R61, since the marker signal impulse *ut*1 (the marker signal impulse assigned to the storage device *Sp*1) is connected to the upper grid thereof from the transformer UT4 and the identical impulse is connected (at the same instant) to the lower grid from the tens and units switches. The tube RS*t*7 becomes conductive at the instant when the tube R61 passes current, since it receives an impulse from the transformer UT5. Relay P7 energizes in the anode circuit of the tube RS*t*7. This relay closes its contact **5*p*7, thus placing its winding in a holding circuit, and opens its contact 6*p*7** to disconnect the tube RS*t*7. Ground is connected to the wiper *d* of the trunk selector VLW10 by contact **7*p*7 (see contact 5*p*10**, Fig. 1*a*), thereby grounding the *d*-conductor of the trunk line 11 and thus causing disconnection of the control or storage device *Sp*1 by shunting the relay P thereof (see Fig. 1*b*). The groups of tubes R51—RS*t*6 and R61—RS*t*7 are put in operation successively.

Instead of starting the trunk selector VLW10 over the conductor *m* by direct current from the storage device *Sp*1, it is possible to utilize therefor the marker signal impulse *ut*1 by providing a start circuit similar to the circuit for the energization of the start relay A2 by means of the tube RS*t*8.

As explained before, the trunk selector VLW1 of Fig. 1*a* hunts, by means of a test relay connected with its wiper *c*, for an idle one of the one hundred trunk lines 11 . . . 00. This *c*-conductor, which serves testing purposes, can be saved in the following manner: When the subscriber removes his receiver, his line relay places on the *d*-conductor of his line at a predetermined instant a periodically effective current impulse *ut*1. A storage or control device is at the same time started by a relay which is common to a group of one hundred lines, and this storage device hunts for an idle trunk line. This trunk line is likewise marked by the current impulse *ut*1. A starting chain starts a set of switches comprising a line finder and a trunk selector in the first 100-group to which the calling subscriber belongs, for example, the line finder AS10 and the trunk selector VLW10. Impulse *ut*1 is also connected to the lower grids of the tubes such as R51 and R61 of Fig. 13. The line finder AS10 and the trunk selector VLW10 therefore are stopped at the bank contacts which are marked by the marker signal impulse *ut*1. The line relay of the subscriber is thereafter deenergized and the marker signal impulse *ut*1 is disconnected from the line multiple. The marker signal impulse *ut*1 is disconnected in the connecting equipment by the progressive operation of the starting chain. The previously mentioned line relay disconnects the marker impulse *ut*1 from the trunk line and switches over to the current impulse which is assigned to the storage device which is required, as described, for finding the desired line. This mode of building up the connection corresponds to the progressive building up of the call to the desired subscriber.

The switching operations subsequent to the completion of a call may follow the usual practice in automatic telephone systems.

The number of simultaneous calls depends on the number of storage or control devices. In the assumed case ten calls may be simultaneously made. If a call is to be made to another party, for example, to the line T511 in the fifth 100-group (instead of to the subscriber T100), an idle control device, for example, S*p*W2, will become effective after an idle trunk switch has connected with a trunk line, for example, the trunk line 00 by testing over its wiper *d* to the bank contact 00. The device S*p*2 is now connected to the calling line. The first digit corresponding to the desired number, consisting of five impulses, causes the setting of a switch corresponding to the switch H, to place its wipers on the bank contacts 5. A trunk selector, for example, the selector VLW51, of the first set of switches in the fifth 100-group is thereupon started, the testing circuit involving its wiper *d*. The switch is stopped when its wipers reach the bank contacts 5, since 00 now engaged by wiper *d* of switch VLW51 conductor receives the marker signal impulses *ut*2 assigned to the storage device S*p*2. The relay P51 energizes and stops the trunk selector VLW51 as described before in connection with switch VLW10. The closure of the contact S*p*51 at the wiper *d* of the switch VLW51 reduces the potential of the marker signal impulse *ut*2. The conductors *m* and *n* connected to the bank contacts 5 occupied by the 100-group switch are opened. The next digit transmitted by the calling subscriber T111, consisting of one current impulse, causes operation of the tens switch Z to engage the bank contacts 1, and the following digit, which also consists of one impulse, will cause setting of the units switch E to engage the bank contacts 1. The line 11 is then marked in the multiple of all line finders by periodic connection thereto of the marker impulse *ut*2. The potential is increased in the storage device S*p*2, and the marker signal impulse *ut*2 increases at the wiper *d* of the trunk selector VLW51, which has reached the line 11, to such an extent that the line finder AS51 associated with the trunk selector VLW51 is started. When the wiper *d* of the line finder AS51 reaches the line 11 (to which is periodically transmitted the marker impulse *ut*2), the relay P51 in the test circuit PS51 will energize (the marker signal impulse *ut*2 being simultaneously effective over the contact 11 and therefore over the wiper *d* of the trunk selector VLW51), and the line finder AS51 is accordingly stopped. The relay P in the storage device S*p*2 now deenergizes and frees the storage device for other calls. Connection is now established between the calling subscriber T111 and the called party T511 over the line finder AS1, trunk selector VLW1 and the trunk selector VLW51, as well as the line finder AS51. The call may be completed in usual manner.

If a call is to be made to another exchange, the exchange number is transmitted first and an idle trunk selector is actuated which hunts for an idle trunk line to the desired exchange. The call is then completed over the trunk line.

It will be seen from the diagram, Fig. 14, that, if two 100-group switches H1 and H2 are connected to the identical 100-group 1, there will be a connection of these two switches to the associated tens and units switches Z1—E1 and Z2—E2, respectively, due to the bank multiple, and the two marker current impulses, for example, *ut*1 and *ut*2, may give rise to wrong connections. It is therefore necessary to block the paths between the 100-group switches and the tens and units switches against the marker signal impulses of the other switches. This may be done by the use of rectifiers G11 and G12 shown in dotted lines in Fig. 14. The blocking resistance of the rectifiers must in each case be high relative to the resistance of the generator output which delivers the marker signal impulses.

Another solution is diagrammatically indicated in Fig. 15. Instead of rectifiers, there are provided discharge tubes R71 and R74 for the purpose of blocking the marker signal impulses of one storage device in the other storage device upon operation of the one hundred switches in the same 100-group.

Another mode of building up a connection in a 1000-line system as shown in Fig. 16. One hundred discharge tubes are used in the line multiple in this example. Three marking stages, namely, hundreds, tens and units stages, are used for determining an outgoing line. The tube multiple is so arranged that one tube is assigned in common to the lines T001, T101 . . . T901, as well as to the lines T002, T102 . . . T902. In other words, ten subscribers have a tube in common. The anodes of these tubes, which serve identical purposes, are multipled over the tens marker stage, while the multipling of the control grids is carried out over the units marker stage. The two electrodes test for the simultaneous occurrence of the marker impulses. The remaining electrodes, which are formed by the cathodes, permit appearance of a signal upon determining simultaneity of current impulses for the purpose of marking the outgoing circuit branch of a call. If a subscriber's line, for example, the line T201, is to be marked in response to a selection by the calling subscriber, the hundreds switch H will receive ten impulses to set its wipers on the 0-bank contacts, and the tens switch Z will receive two impulses to set its wiper on the bank contact 2, while the units switch E receives one impulse to set its wiper in engagement with the bank contact 1. The amplifier tubes V1, V2, V3 amplify the marker signal impulse *ut*1 which is to be transmitted over the wipers of the hundreds, tens and units switches. This amplified impulse *ut*1 is accordingly transmitted over the wiper of the hundreds switch H (engaging bank contact 0) to the upper grid of the tube R75 (Fig. 16) over the circuit path shown in prominent lines. The impulse *ut*1 connected over the wiper of the tens switch Z is transmitted over the prominently indicated path to the anode of the tube RS*t*21, while the current impulse *ut*1 connected to the wiper of the units switch E is effective to the grid of the tube RS*t*21 over the prominently indicated path. The tube RS*t*21 becomes conductive, thereby producing at the midpoint between the two cathode resistors an impulse corresponding to the impulse *ut*1 which is placed over the prominently indicated path on bank contacts of the line finders AS which coact with the *d*-wipers thereof. Now, when the *d*-wiper of the line finder AS (001–000) shown in Fig. 16 reaches the marked bank contact, the impulse placed thereon will be connected to the lower grid of the tube R75 and, since there is also potential from the signal impulse *ut*1 on the upper grid, this tube will become operative to fire the tube RS*t*75 by an impulse from the transformer in the anode circuit of the tube R75. Relay P75 in the anode circuit of the tube RS*t*75 will now energize and stop the line finder AS (001–000). The line of the desired subscriber TO21 is now marked. The connection may be completed by this marking in desired and suitable manner. The talking circuit may be completed over further wipers (not shown) of the line finder AS (001–000). As compared with the circuit of Fig. 1, the arrangement just described eliminates a certain number of units switches, because the three switches shown (H, Z and E) permit the marking of one thousand lines.

If the circuit of Fig. 16 is employed, it will be desirable to test the tubes during the operation of the system, and such testing can be done by the means shown in Fig. 17. There is provided a test switch PW having wipers *c* and *d* for coaction with associated bank contacts. The conductors from these bank contacts extend in multipled manner, as shown, to the anodes and to the grids, respectively, of the tubes to be tested. The tube RS*t*11 will, for example, become conductive in time with a current impulse *utp* which is displaced in time relative to the marker signal impulses, at the instant when the wipers *c* and *d* of the switch PW are in engagement with bank contacts 1. If the tube RS*t*11 is in proper working condition, there will result an amplified impulse *utp* at the test transformer PT*r* of Fig. 17. The tube R*p* becomes conductive by the impulse connected to its lower grid, since the impulse *utp* is also on its upper grid, causing operation of the tube RS*tp* and resulting in energization of the relay R to operate a suitable and desired signal. The test switch PW is suitably stepped to advance its wipers by one step so as to test the tube RS*t*12 in a similar manner. The operation is repeated from tube to tube. If a defective tube is found (no anode current), there will not be an amplified impulse for the operation of the tube R*p*. A suitable and desired alarm signal may then be operated to indicate the faulty condition.

Changes may be made within the scope and spirit of the appended claims.

We claim:

1. An automatic telephone system having incoming lines coming from calling subscribers and outgoing lines extending to called subscribers, switches for establishing connections between calling incoming lines and called outgoing lines, testing means for said switches for controlling completion of connections thereby, and means for connecting to the incoming and to the outgoing lines of connections to be established momentarily effective periodically recurring marker signals to designate such lines which are to be connected to complete calls, said testing means being operatively responsive only to the simultaneous occurrence of said marker signals on said incoming and outgoing lines for causing said switches to complete the corresponding connections.

2. The system defined in claim 1, wherein said marker signals are periodically recurring single impulses.

3. The system defined in claim 1, wherein said marker signals are periodically recurring groups of impulses.

4. The system defined in claim 1, wherein said marker signals are displaced as to time, and means for transmitting such impulses to a plurality of incoming and outgoing lines involved in building up a plurality of simultaneous connections.

5. The system defined in claim 1, together with a generator for transmitting groups of marker signals during predetermined successively effective intervals.

6. The system defined in claim 1, together with a generator for transmitting said marker signals during predetermined successively effective intervals, said generator comprising an oscillator for delivering impulses of sine wave shape, and means for modifying said impulses to produce a plurality of marker signals which are displaced as to time, the frequency of said oscillator determining the periods of transmission of said marker signals.

7. The system defined in claim 1, wherein said testing means is repeatedly effective for coaction with a plurality of switches.

8. The system defined in claim 5, wherein the period of time during which said switches are in engagement with any one line incident to the operation of said switches in establishing calls to desired lines is greater than the time required for the transmission of a group of said marker signals plus the response time of said testing means.

9. The system defined in claim 1, wherein said testing means comprises electron discharge devices, and circuit means for conducting to different electrodes of said discharge devices the marker signals which are to be tested for simultaneous occurrence.

10. The system defined in claim 1, wherein said testing means comprises electron discharge devices, circuit means for conducting to different electrodes of said discharge devices the marker signals which are to be tested for simultaneous occurrence, the corresponding discharge devices becoming conductive only in the simultaneous presence of said marker signals on said electrodes, and a control circuit including a discharge tube operated responsive to the operation of said discharge devices for controlling the operation of said switches in completing the corresponding connections.

11. The system defined in claim 1, wherein said testing means comprises a double grid electron tube, and circuit means for conducting to the control grids of said tube the marker signals which are to be tested for simultaneous occurrence.

12. The system defined in claim 1, wherein said testing means comprises an electron discharge tube, and circuit means for conducting to the anode and to a control electrode the marker signals which are to be tested for simultaneous occurrence.

13. The system defined in claim 1, wherein said testing means comprises an electron discharge tube, circuit means for conducting to the anode and to a control electrode the marker signals which are to be tested for simultaneous occurrence, said tube becoming conductive only in the simultaneous presence of said signals, and means governed by said tube for controlling the operation of said switches in completing the corresponding connections.

14. The system defined in claim 1, wherein said testing means comprises a modulator circuit having two input terminals, means for conducting to said terminals the marker signals which are to be tested for simultaneous occurrence, and rectifier means in said circuit for permitting passage therethrough of marker signals delivered to one input terminal only in the simultaneous presence of a corresponding marker signal delivered to the other input terminal.

15. The system defined in claim 1, wherein said testing means comprises two electron discharge tubes, circuit means including resistor and rectifier means for interconnecting predetermined electrodes of said tubes, and means for conducting to the control grids of said tubes the marker signals which are to be tested for simultaneous occurrence.

16. The system defined in claim 1, wherein said testing means comprises two electron discharge tubes, means including a resistor for connecting the anodes of said tubes to a positive potential and for biasing the grids of said tubes so as to make said tubes normally conductive, and means for conducting to the control grids of said tubes the marker signals which are to be tested for simultaneous occurrence, said tubes being extinguished responsive to the simultaneous presence of said marker signals on the control grids thereof to cause a potential on the anode terminals for controlling the operation of said switches in completing the corresponding connections.

17. The system defined in claim 1, wherein said testing means comprises two electron discharge tubes, a control circuit governed by said tubes for controlling the operation of said switches in completing the corresponding connections, and means for conducting to the control grids of said tubes the marker signals which are to be tested for simultaneous occurrence, said tubes becoming operative only responsive to the simultaneous presence of said marker signals to make said control circuit effective.

18. The system defined in claim 1, together with marker signal storage means, and means for assigning to said storage means predetermined marker signals.

19. The system defined in claim 1, together with marker signal storage means, and means for assigning to said storage means predetermined marker signals for controlling the operation of said switches in establishing connections.

20. The system defined in claim 1, together with marker signal storage means, switch means for associating said storage means with the incoming line of a connection which is to be established, means for assigning to said storage means a predetermined marker signal, means controlled by said storage means for connecting said assigned marker signal to a conductor of said incoming line, and means for connecting the identical marker signal to a conductor of the outgoing line of the connection which is to be established.

21. The system defined in claim 1, wherein said switches include switches controlled by impulses originating at calling subscribers' stations to extend the corresponding incoming lines to outgoing lines leading to desired subscribers' stations, storage means for receiving predetermined marker signals, switch means for selectively associating storage means with incoming lines, and means controlled by said storage means for connecting the marker signal received thereby to the associated incoming and outgoing lines of the connections corresponding thereto.

22. The system defined in claim 1, wherein said switches include switches controlled by impulses originating at calling subscribers' stations to extend the corresponding incoming lines to the outgoing lines leading to desired subscribers' stations, storage means, means for assigning and transmitting to said storage means predetermined marker signals, means for connecting said storage means with incoming lines involved in building up connections, means in said storage means for receiving impulses originating at the corresponding calling subscribers' stations to designate the outgoing lines of desired called stations, and means controlled by said storage means for connecting the marker signal assigned thereto to said incoming and outgoing lines.

23. The system defined in claim 1, wherein said switches include switches controlled by impulses originating at calling subscribers' stations to extend the corresponding incoming lines to the outgoing lines leading to desired subscribers' stations, storage means, means for assigning and transmitting to said storage means predetermined marker signals, means for connecting said storage means with incoming lines involved in building up connections, means in said storage means for receiving impulses originating at the corresponding calling subscribers' stations to designate the outgoing lines of desired called stations, means controlled by said storage means for connecting the marker signal assigned thereto to said incoming and outgoing lines, and testing means common to the switching means in said incoming and outgoing lines for testing for the simultaneous presence of said marker signals.

24. The system defined in claim 1, wherein said incoming and outgoing lines are disposed in multiple relationship accessible to a plurality of said switches, and control means for governing the effect of said marker signals on a plurality of incoming and outgoing lines in the same groups of lines, in the event of a plurality of simultaneous connections to be set up, said last-named control means comprising discriminating circuit means for causing only predetermined marker signals to take effect in associated incoming and outgoing lines of connections to be set up.

25. The system defined in claim 1, together with electron discharge tubes for controlling the operation of said switches responsive to marker signals transmitted thereto, said electron tubes having at least a plurality of electrodes corresponding in number to the number of marking stages of the outgoing lines of connections to be set up, and means for connecting in multiple relationship identical electrodes of said electron tubes.

26. The system defined in claim 1, together with electron discharge tubes for controlling the operation of said switches responsive to marker signals transmitted thereto, said electron tubes having at least a plurality of electrodes corresponding in number to the number of marking stages of the outgoing lines of connections to be set up, means for connecting in multiple relationship identical electrodes of said electron tubes, means for transmitting to said electrodes the marker signals which are to be tested for simultaneous occurrence, said tubes being effective responsive to simultaneous occurrence of said marker signals to produce a signal for controlling the operation of the switches in the outgoing lines of connections to be set up.

27. The system defined in claim 1, together with electron discharge tubes for controlling the operation of said switches responsive to marker signals transmitted thereto, said electron tubes having at least a plurality of electrodes corresponding in number to the number of marking stages of the outgoing lines of connections to be set up, means for connecting in multiple relationship identical electrodes of said electron tubes, means for transmitting to said electrodes the marker signals which are to be tested for simultaneous occurrence, and a device for testing the operative condition of said electron tubes during the operation of said system, said device comprising means for successively transmitting to the control electrodes of said tubes test signal impulses to cause said tubes to produce test-responsive signals indicating the operating condition thereof.

No references cited.